June 20, 1967  B. F. FLODEN  3,326,626
INDEXING DEVICE

Filed July 24, 1964  2 Sheets-Sheet 1

INVENTOR.
BJORN F. FLODEN
BY Morris Rebkin
Attorney

June 20, 1967 B. F. FLODEN 3,326,626
INDEXING DEVICE
Filed July 24, 1964 2 Sheets-Sheet 2
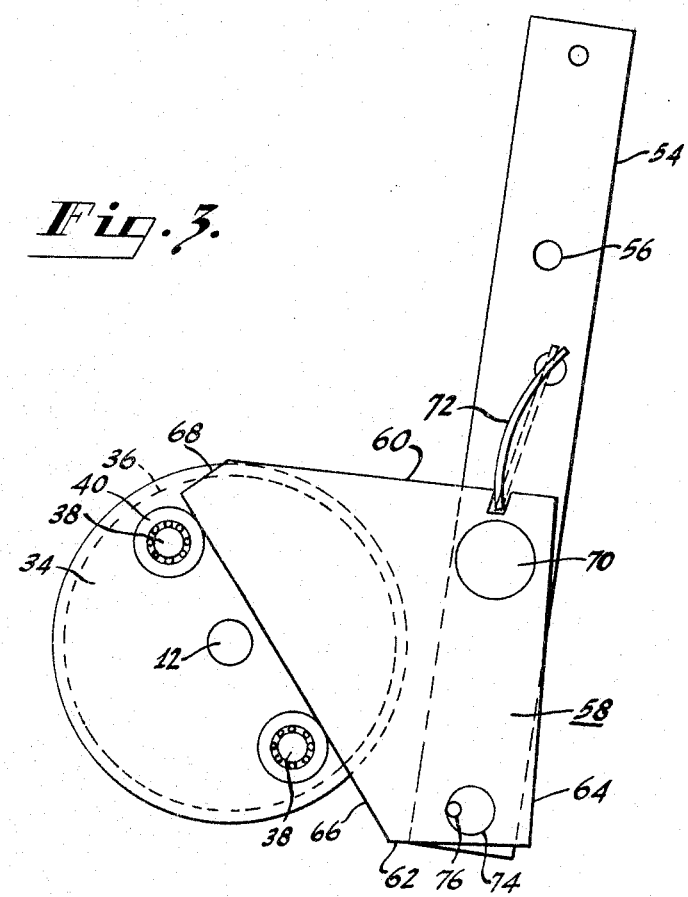
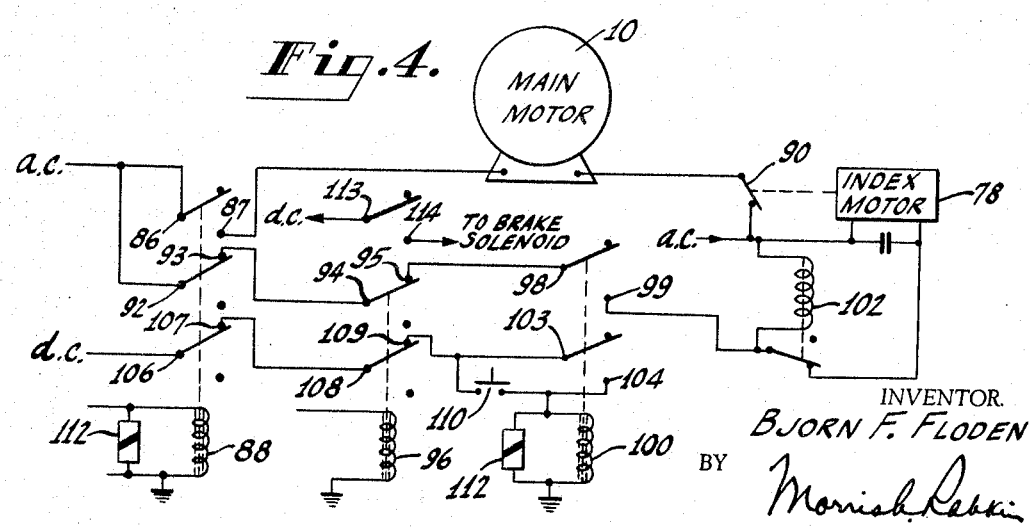
INVENTOR.
BJORN F. FLODEN
BY
Morrish Rabkin
Attorney 3,326,626
INDEXING DEVICE
Bjorn F. Floden, Palmyra, N.J., assignor to Radio Corporation of America, a corporation of Delaware
Filed July 24, 1964, Ser. No. 385,000
7 Claims. (Cl. 352—169)

This invention relates to motion picture projectors, and particularly to an indexing means that is adapted for indexing the shutter of a motion picture projector when still pictures are to be projected.

When a moving picture is being projected, the film is advanced intermittently through the projector film gate and a shutter is rotated in synchronism with the advance of the film and in such manner that an opaque portion of the shutter occults the light when the film is in motion. When a still picture is to be projected, the shutter must be in such a position that no light is occulted. Therefore, means must be provided to move or index the shutter to light transmitting position during projection of a still picture. If, as sometimes happens, the indexing means and the means to be indexed are lined up so as to be at dead center, means must be provided to permit the indexing means to properly index the shutter in spite of the occurrence of the dead center condition.

It is an object of this invention to provide, in a motion picture projector, an improved indexing means for insuring proper positioning of the shutter when it is desired to project a still picture from a moving picture film.

It is a further object of this invention to provide an improved indexing means as aforesaid embodying a means for breaking any dead center alignment that may occur between the indexing and indexed parts of the shutter indexing mechanism.

In accordance with this invention, a rotary disk is provided with two diametrically aligned indexing members, which may be pins fitted with antifriction bearings. The indexing members extend from the disk parallel to the axis thereof. Cam means are provided to contact the members and to move them to one or the other of two predetermined, indexed positions. The disk is rotationally coupled to the shutter by a timing belt and pulleys in such a manner that, when the members are in either of the said two predetermined positions, the shutter is in light transmitting position. The cam is resiliently mounted so that, when a dead center alignment of the members and of the cam occurs, the cam is caused to assume a position in which the dead center alignment is broken, whereby proper indexing of the shutter takes place whether or not the dead center alignment occurs initially.

The novel features of this invention, both as to its organization and method of operation, as well as additional objects and advantages thereof, will be understood more readily from the following description, when read in conjunction with the accompanying drawings, in which:

FIGS. 2 and 3 are views showing the cam and disk portion of the indexing means at a larger scale, these figures being useful in explaining the operation of the device of FIG. 1; and FIG. 4 is a circuit diagram of one form of function and control circuitry useful with the index device of FIG. 1.

Figure 1:
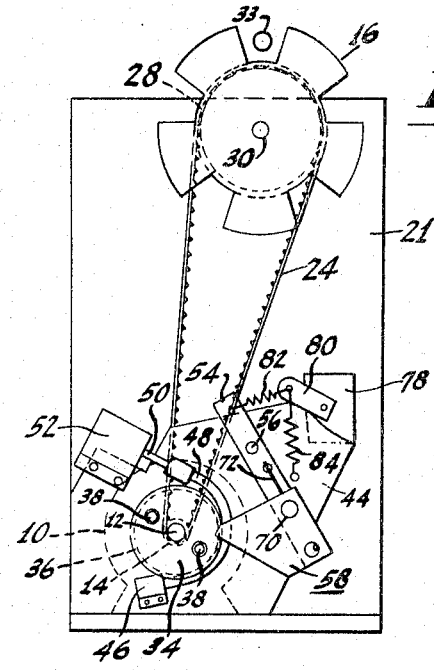
FIG. 1 is a diagrammatic view showing of that portion of a moving picture projector which includes the shutter and the driving means therefor, and in which is incorporated one form of shutter indexing means according to the present invention.

In FIG. 1, there is shown a main motor 10 having a shaft 12 extending from the far end thereof (as viewed in FIG. 1) on which a small, toothed, timing pulley 14 is fixed. The motor 10 drives a light shutter 16 directly by means of a toothed timing belt 24 fitted around the pulley 14 and around a second, large, toothed pulley 28 which is fixed to a shaft 30 on which the shutter 16 is fixed. The shaft 30 is rotationally mounted on a plate 21. The shutter 16 comprises an opaque disk having portions of the rim thereof cut away. When properly indexed, the disk is in a position such that a picture projecting light beam 33 is projected through one or another of the cutaway portions of the shutter.

The indexing means includes a circular disk 34 having a grooved periphery 36 for purposes to be described and fixed to the other or near end of the main motor shaft 12 for rotation therewith. A pair of indexing members 38, 38 extend from the disk 34 parallel to the axis thereof and in a direction away from the motor 10. The members 38, 38 are aligned with the center of the disk 34 along two separate radii which may lie along a common diameter. Each member 38 may comprise an anti-friction bearing (better shown in FIGS. 2 and 3) mounted on the disk 34. The belt 24 is so arranged on its pulleys 14 and 28 with respect to the shutter 16 and the motor shaft 12, and the speed reduction performed thereby is so chosen that, each time the members 38, 38 assume a predetermined angle with respect to the casing of the motor 10 (that is, twice during each rotation of the disk 34), the shutter 16 is in a position where it does not occult the light beam 33 of the projector.

An auxiliary supporting plate 44 is positioned between the motor 10 and the disk 34, the shaft 12 of the motor 10 extending through the supporting plate 44. A brake anchor 46 is fixed to the supporting plate 44 below the disk 34, as viewed in FIG. 1. One end of a flexible, resilient brake band 48, which may be rubber, is fixed to the anchor 46, and the band 48 is curved to conform with the periphery of the disk 34. The other end of the brake band 48 is fixed to the moving element 50 of a brake solenoid 52 which is supported on the plate 44 to the left of and above the disk 34, as viewed in FIG. 1. Upon energization of the solenoid 52, the brake band 48 is tightened into the groove 36 in the periphery of the disk 34 and the friction of the disk 34 with the rubber brake band 48 acts to brake the motor 10. When the solenoid 52 is not energized, the natural resilience of the rubber band 48 keeps it substantially out of contact with the disk 34, whereby no braking takes place.

Figure 2:
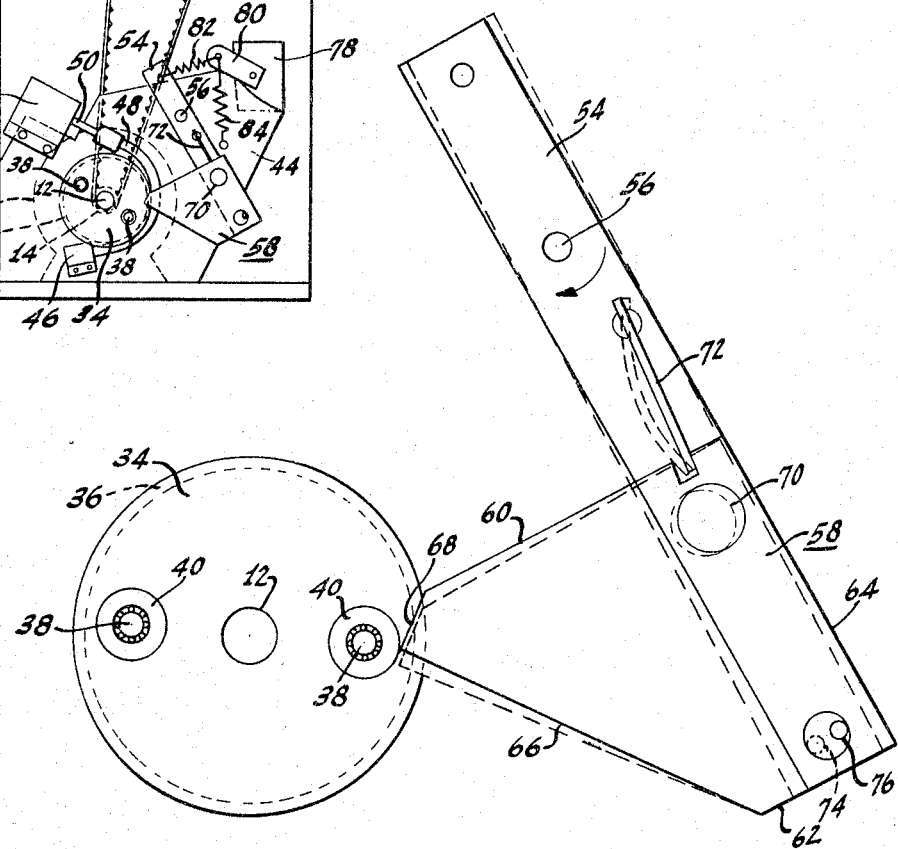

A cam lever 54 is pivotally mounted on the plate 44 by a pin 56 extending through the lever 54 intermediate its ends, the pin 56 being positioned above and to the right of the disk 34, as viewed in FIGS. 1, 2 and 3. A cam 58 is pivotally mounted on the lower portion of the lever 54. This cam 58 comprises a flat plate having five edges, the first two 60 and 62 of the edges being parallel to each other, and a third edge 64 being perpendicular to the two parallel edges 60 and 62. A fourth edge 66 extends at an obtuse angle upwards and to the left (as viewed in FIGS. 1–3) from the shorter one 62 of the parallel edges towards the other, or the longer edge 60, of the parallel edges 60 and 62. A fifth edge 68 extends substantially perpendicularly from the fourth edge 66 towards the longer edge 60 of the parallel edges.

The cam 58 is so pivotally mounted on the lower end of the cam lever 54 that the third edge 64 extends along an edge of the cam lever 54 and the longer edge 60 of the parallel edges extends transversely of the lever 54 and intermediate the pivot pin 56 and the lower end of the lever 54. The pivot 70 on which the cam 58 is pivotally mounted extends through the cam lever 54 and through the cam 58 in the corner formed by the longer parallel edge 60 and the third edge 64. A leaf spring 72 extends into the cam 58 and is fixed to the cam lever 54 between the pivots 56 and 70. The leaf spring 72 urges the cam 58 clockwise about its pivot 70, as viewed in FIGS. 1–3. A hole 74 is provided in the cam 58, and a pin 76 having a diameter smaller than the diameter of the hole 74 extends from the cam lever 54 into the hole 74 to limit pivotal motion of the cam 58.

An indexing gear motor 78, for rotating the cam lever 54 about its pivot 56, is mounted on the plate 44 above and to the right of the pivot 56, as viewed in FIG. 1. A crank arm 80 is fixed to the shaft of the indexing motor 78. The ends of a stiff tension spring 82 are fixed to the free ends of the cam lever 54 and the crank arm 80, respectively, the spring 82 acting, effectively, as a link between the crank arm 80 and the cam lever 54, and also to cushion the stop impact on the gear motor 78. A return spring 84 is stretched between the free end of the crank arm 80 and an anchor point on the supporting plate 44.

A suitable circuit for the indexing means is shown in FIG. 4. Alternating current (A.C.) is supplied from one pole of an A.C. supply to the main motor 10 through the contacts 86, 87 of a run relay 88 and from the main motor 10 through the contacts of a safety switch 90 to the other pole of the A.C. supply. Also, A.C. is supplied to the indexing motor 78 through other contacts 92, 93 of the run relay 88, through contacts 94, 95 of a brake solenoid relay 96, through contacts 98, 99 of an indexing relay 100, and through the contacts of a slow-to-operate relay 102, all in series, and back to the other pole of the A.C. supply. The coil of the indexing relay 100 is energized thru a normally open push button switch 110 or thru a pair of holding contacts 103 and 104 of the relay 100. Direct current (D.C.) is applied to the switch 110 and to the hold contact 103 of the indexing relay 100 through normally closed contacts 106, 107 of the run relay 88 and through normally closed contacts 108, 109 of the brake relay 96 in series. Separate varistors 112 whose resistances are high for low voltages applied thereacross and low for high voltages applied thereacross may be connected, respectively, across the coils of the run relay 88 and the indexing relay 100, if desired, to suppress arcing at the contacts of the respective relays to thereby minimize the effect of transients on the accompanying sound system. The coil of the slow-to-operate relay 102 is connected to the A.C. supply through the same contacts of the run relay 88, the brake relay 96, and the indexing relay 100 as are in the circuit of the index motor 78. The brake solenoid 52 is energized through the contacts 113, 114 of the brake relay 96.

Let it be assumed that the main motor run relay 88 is not energized whereby no power is supplied to the main motor 10, and that the brake solenoid relay 96 is not energized whereby the brake is off, so that the shaft 12 of the main motor 10 is free to turn. Then, when the "on" switch 110 is closed momentarily, the indexing relay 100 is energized and the hold contacts 103 and 104 are closed and a hold circuit is set up for the indexing relay 100. The index motor 78 will be energized upon energization of the indexing relay 100. At the same instant, the slow-to-operate relay 102 will also be energized. However, it will not operate to open its contacts to thereby break the power circuit to the index motor 78 for a predetermined length of time, whereby the indexing motor 78 will operate long enough to cause indexing of the shutter 16 of the projector as explained below. In normal operation, the indexing motor 78 is stalled while still energized, when the indexing cam 58 is brought to a stop against both members 38. The spring 82 absorbs the energy of the indexing motor 78 as it is forced to stop. The energy stored therein is used to help rotate the indexing motor 78 and its gears in reverse during the return or reset motion of the indexing mechanism. As soon as the indexing motor 78 starts, it opens the safety switch 90 in series with the main motor supply to prevent starting of the main motor 10 while the indexing operation is being performed. As soon as the slow-to-operate relay 102 operates, power is removed from the indexing motor 78, and the spring 82 and the return spring 84 return the arm 80 of the indexing motor, and thereby the cam lever 54, to its stand-by position, at which position it closes safety switch 90. The indexing relay 100 may be de-energized by energizing the run relay 88 or the brake relay 96, thereby breaking the supply circuit for the indexing relay 100.

As the indexing motor 78 rotates, it causes the cam lever 54 to rotate clockwise, as viewed in FIGS. 1–3. As the cam lever 54 is rotated clockwise, the cam 58 eventually takes the position shown in FIG. 3. At this position of the cam 58, the fourth edge 66 thereof contacts both indexing members 38, 38 on the disk 34, thereby rotating the disk 34 to its indexing position corresponding to a light transmitting position of the shutter 16. The cam 58 may be rotated on the cam lever 54 about its pivot point 70 against the urging of the leaf spring 72 to permit the cam edge 66 to contact both members 38, 38. At this position of the cam 58, the members 38, 38 on the disk 34 are in one of their two predetermined angular positions at which the shutter 16 does not occult the light beam 33 of the projector.

Now, let it be assumed that the motor 10 stops in such a position that the pressure at the tip of the cam 58 at the junction of the fourth and fifth edges 66 and 68 of the cam 58 is directed along a line joining the two members 38, 38 through their respective axes, as shown in solid lines in FIG. 2, whereby dead center conditions are present. In such case, the cam 58, upon further rotation clockwise of the cam lever 54, takes the position shown in dotted lines in FIG. 2, in which pressure is applied by the fifth edge 68 of the cam 58 in such a direction on the member 40 in contact therewith as to rotate the disk 34 counter-clockwise through a small angle great enough, however, to break the dead center condition. Further rotation of the cam lever 54 in its clockwise direction will bring the parts to the index position shown in FIG. 3. Of course, if the disk 34 has stopped in a position such that the cam edge 68 will engage a member 38 directly, the action just described will also take place upon the further rotation of the cam lever 54.

Although a single indexing system has been shown and described, it will undoubtedly be apparent to those skilled in the art that variations in the described system and in the parts thereof, as well as other forms thereof, are possible within the spirit of the present invention. Hence, it is intended that the above-described indexing system be considered as illustrative and not in a limiting sense.

What is claimed is:

1. Indexing mechanism for indexing a rotary member to a predetermined position, said mechanism comprising
   (a) a rotatable disk coupled to said rotary member for rotation in unison therewith,
   (b) a pair of indexing members extending from said disk,
   (c) indexing cam means for cooperation with said indexing members, said cam means being normally disposed to be out of engagement with said indexing members, and
   (d) means for effecting engagement of said indexing cam with said indexing members to thereby index said disk to a position corresponding to said predetermined position of said rotary member.

2. In a moving picture projector having a rotary light shutter, indexing mechanism for indexing said shutter to a light transmitting position, said mechanism comprising, in combination with said shutter,
   (a) a rotatable disk coupled to said shutter for rotation in unison therewith,
   (b) a pair of indexing members extending from said disk,
   (c) an indexing cam for cooperation with said members, said cam having a pair of relatively inclined cam edges terminating in a point, one of said cam edges being adapted to engage said members for indexing said disk to a predetermined position corresponding to said light transmitting position of said shutter, said cam being normally disposed so that said edges are clear of said members, and
(d) means for bringing said one cam edge into engagement with said members to thereby index said disk to said predetermined position and thereby lock said shutter in said light transmitting position.

3. In an indexing system for a rotatable device to be indexed, the combination of
(a) a rotatable disk rotationally coupled to said device to be indexed and having at least two diametrically aligned indexing members extending therefrom,
(b) a pivotally mounted cam lever having a cam mounted adjacent one end thereof, said cam having a cam edge, and
(c) means to rotate said lever to bring said cam edge into contact with said members whereby said disk and said device are indexed.

4. An indexing means for indexing a rotatable disk having a pair of indexing members thereon parallel to the axis of rotation thereof, said indexing means comprising
(a) a pivotally mounted cam lever,
(b) a cam pivotally mounted on said cam lever,
(c) means for rotating said cam lever in a direction towards said members,
(d) spring means for urging said cam in said direction with respect to said cam lever and for permitting rotation of said cam in the opposite direction with respect to said cam lever, and
(e) means for limiting the rotation of said cam with respect to said cam lever.

5. In an indexing system for a rotatable device to be indexed, the combination of
(a) a rotatable disk rotationally coupled to said device and having at least two indexing members extending therefrom parallel to its axis of rotation and spaced from the center of said disk along different radii of said disk,
(b) a pivotally mounted cam lever having a cam pivotally mounted thereon, said cam having a cam edge,
(c) means to rotate said lever in one direction to bring said cam edge into contact with at least one of said indexing members,
(d) spring means to urge said cam in said direction and for permitting pivoting of said cam in the opposite direction with respect to said cam lever, and
(e) means for limiting the angle of pivoting of said cam with respect to said cam lever so that, upon occurrence of dead center relation between a point on the contacting edge of said cam and one of said indexing members and the center of rotation of said disk, said cam will pivot on said lever to be rotated out of said dead center relation whereby, upon further rotation of said cam lever, said cam edge will engage both of said indexing members to index said disk and said device.

6. In a moving picture projector having a rotary light shutter, indexing mechanism for indexing said shutter to a light transmitting position, said mechanism comprising, in combination with said shutter,
(a) a rotatable disk coupled to said shutter for rotation in unison therewith,
(b) a pair of indexing members extending from said disk,
(c) a pivotally mounted lever in proximity to said disk, and rotatable about its pivot towards and away from said members,
(d) an indexing cam pivotally carried by said lever,
(e) stop means for limiting the angle of rotation of said cam about its pivot,
(f) resilient means for holding said cam in a rotated position thereof against said stop means in the direction towards said members,
(g) said cam having a pair of relatively inclined cam edges terminating in a point, one of said cam edges being adapted to engage said members for indexing said disk to a predetermined indexed position corresponding to said light transmitting position of said shutter, and
(h) means for rotating said cam towards said members to bring said cam into contact with one of said members to cause rotation of said disk, said cam rotating about its pivot against the urging of said resilient means upon occurence of a dead-center relation between said cam and said one member to thereby break said dead-center relation whereby, upon continued rotation of said lever in a direction toward said members, said one edge of said cam will assume contact with both of said members and hold said disk in said indexed position.

7. Cam means for an indexing device comprising
(a) a support means,
(b) a cam lever pivotally mounted on said support means,
(c) a polygonal cam pivotally mounted on said cam lever, said cam having two edges meeting at a point, and said point being located laterally of said cam lever in a predetermined direction,
(d) spring means for urging rotation of said cam with respect to said cam lever in a direction such that said point leads, and
(e) means for limiting the extent of the rotation of said cam with respect to said cam lever.

References Cited
UNITED STATES PATENTS

| | | | |
|---|---|---|---|
| 2,323,576 | 7/1943 | Sperry | 352—169 X |
| 2,649,018 | 8/1953 | Schnetzer | 352—174 X |
| 2,943,532 | 7/1960 | Hashimoto | 352—169 |
| 3,059,498 | 10/1962 | Boyd | 74—527 |
| 3,106,126 | 10/1963 | Kirk | 352—169 |
| 3,137,427 | 6/1964 | Martin | 352—174 X |

JULIA E. COINER, *Primary Examiner.*